(12) United States Patent
Obermark

(10) Patent No.: US 10,107,406 B2
(45) Date of Patent: Oct. 23, 2018

(54) BALL VALVE WITH PRESSURE RELIEF FEATURE

(71) Applicant: Parker-Hannifin Corporation, Cleveland, OH (US)

(72) Inventor: Craig Obermark, Washington, MO (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 15/569,651

(22) PCT Filed: Dec. 15, 2015

(86) PCT No.: PCT/US2015/065748
§ 371 (c)(1),
(2) Date: Oct. 26, 2017

(87) PCT Pub. No.: WO2016/182599
PCT Pub. Date: Nov. 17, 2016

(65) Prior Publication Data
US 2018/0112784 A1    Apr. 26, 2018

Related U.S. Application Data

(60) Provisional application No. 62/160,633, filed on May 13, 2015.

(51) Int. Cl.
*F16K 17/168* (2006.01)
*F16K 15/04* (2006.01)
(Continued)

(52) U.S. Cl.
CPC .............. *F16K 17/168* (2013.01); *F16K 5/06* (2013.01); *F16K 5/0605* (2013.01);
(Continued)

(58) Field of Classification Search
CPC ..... Y10T 137/86726; Y10T 137/87338; Y10T 137/87555; Y10T 137/87523;
(Continued)

(56) References Cited

U.S. PATENT DOCUMENTS 4,813,749 A * 3/1989 Cilles ...................... E21C 27/24
251/230
4,928,731 A * 5/1990 Koller ....................... E03B 7/10
137/301

(Continued)

FOREIGN PATENT DOCUMENTS

WO    2012/048369 A1    4/2012

OTHER PUBLICATIONS

International Search Report and Written Opinion for corresponding Patent Application No. PCT/US2015/065748 dated Apr. 25, 2016.

*Primary Examiner* — Atif Chaudry
(74) *Attorney, Agent, or Firm* — Renner, Otto, Boisselle & Sklar, LLP

(57) ABSTRACT

A valve assembly includes a valve body defining a main flow pathway (28) and a bypass channel (52) for bypassing the main flow pathway. A ball (20) is located in the main flow pathway and is moveable between an open position and a closed position. When the ball is in the open position, an open pathway through the ball fluidly completes the main flow pathway to provide an ordinary flow, and when the ball is in the closed position the ball blocks the main flow pathway. A pressure relief feature (50) is disposed in the bypass channel (52), and the valve body further defines a pressure relief passage (62) comprising a clearance between an outer surface of the ball (20) and the valve body. The pressure relief feature (50) permits a relief flow from the bypass channel (52) through the pressure relief passage (62)

(Continued)

around the ball (20), and to the outlet (24) to relieve excess pressure in the connecting inlet piping (22).

18 Claims, 6 Drawing Sheets

(51) Int. Cl.
| | |
|---|---|
| *F16K 5/06* | (2006.01) |
| *F16K 11/076* | (2006.01) |
| *F16K 31/122* | (2006.01) |
| *F16K 15/18* | (2006.01) |
| *F16K 27/06* | (2006.01) |
| *F16K 17/04* | (2006.01) |
| *F16K 31/44* | (2006.01) |

(52) U.S. Cl.
CPC .......... *F16K 11/076* (2013.01); *F16K 15/044* (2013.01); *F16K 15/046* (2013.01); *F16K 15/048* (2013.01); *F16K 15/183* (2013.01); *F16K 15/188* (2013.01); *F16K 17/0406* (2013.01); *F16K 27/067* (2013.01); *F16K 31/1221* (2013.01); *F16K 31/44* (2013.01); *Y10T 137/2584* (2015.04); *Y10T 137/86726* (2015.04); *Y10T 137/87338* (2015.04); *Y10T 137/87523* (2015.04); *Y10T 137/87555* (2015.04)

(58) Field of Classification Search
CPC .......... Y10T 137/2584; F16K 5/0605; F16K 17/168; F16K 11/076
See application file for complete search history.

(56) References Cited

U.S. PATENT DOCUMENTS

| | | | |
|---|---|---|---|
| 5,251,459 A | 10/1993 | Grass et al. | |
| 5,277,248 A | 1/1994 | Breland | |
| 7,367,357 B2 | 5/2008 | Kim | |
| 7,913,503 B2 | 3/2011 | Lu et al. | |
| 2012/0031141 A1 | 2/2012 | Wada | |
| 2014/0251472 A1* | 9/2014 | Woods | F16K 37/005 137/599.11 |
| 2015/0075633 A1* | 3/2015 | Adi | F16K 11/10 137/14 |

* cited by examiner

BALL VALVE WITH PRESSURE RELIEF FEATURE

RELATED APPLICATIONS

This application is a national phase of International Application No. PCT/US2015/065748 filed Dec. 15, 2015 and published in the English language, which claims priority to U.S. Provisional Patent Application No. 62/160,633 filed May 13, 2015, which are hereby incorporated herein by reference.

FIELD OF INVENTION

The present invention relates generally to isolation valves for isolating adjacent portions of a fluid pathway, such as isolation ball valves, and more particularly to pressure relief features of isolation or ball valve assemblies.

BACKGROUND

Isolation valves are a common valve type for isolating adjacent portions of a fluid pathway. A common configuration of an isolation valve is a ball valve that is rotatable between a closed position for blocking fluid flow, and an open position for permitting fluid flow between the adjacent portions of the fluid pathway. An exemplary use of a ball valve of such type is in controlling the flow of a refrigerant through a refrigeration system, such as may be used in a grocery store, storage facility, or like location. Refrigeration systems in such locations may employ multiple refrigerators linked to a common refrigerant source and common or connected flow pathways. Ball valves may be used to control a flow of refrigerant through the system among the individual refrigerators. A ball valve, for example, typically is provided at the inlet and outlet of a refrigerated display case.

In many applications that employ isolation valves, and ball valves in particular, pressure build-up in the fluid system can give rise to safety concerns. This concern can be particularly pronounced in refrigeration systems that operate at high pressure, especially for example in systems in which carbon dioxide is the refrigerant. When closed, the ball valve stops the flow of refrigerant in the system. Trapped refrigerant can warm up while the ball valve is closed, which can cause pressure in the system to build leading to a potentially unsafe condition This issue is particularly acute with carbon dioxide refrigerant because a small change in temperature results in a substantial spike in pressure.

To address the safety issue associated with pressure build-up, ball valve assemblies may be provided with pressure relief features. Conventional ball valve assemblies utilize two valves to relieve the pressure. In such systems, a ball valve and a check valve are typically piped in parallel with one another, with the check valve bleeding off excess pressure. This conventional configuration employing multiple, parallel pathways typically includes several joints that must be brazed together. The conventional configuration is therefore deficient in that the need for several joints brazed together increases the size and number of components in the ball valve assembly, thereby increasing cost and providing for less efficient functioning of the ball valve than is desirable.

SUMMARY OF INVENTION

The present invention provides an isolation valve assembly, and particularly a ball valve assembly that overcomes the deficiencies of conventional configurations. The ball valve assembly of the present invention includes an enhanced pressure relief feature that has a pressure relief valve that is built into the valve body that allows refrigerant or other fluid to flow past the ball valve and through a pressure relief outlet. In particular, flow passages may be configured to allow fluid to flow around the ball and past the ball seals in the ball valve so as to relieve any pressure build-up within the system. The ball valve assembly with the pressure relief feature of the present invention reduces the number of braze joints as compared to the conventional parallel two-valve configuration, thereby reducing cost in brazing materials, labor to create the joints, and materials. By reducing the number of braze joints, the present invention also reduces potential leak points through the system, which enhances valve reliability.

An aspect of the invention is an isolation valve assembly. In exemplary embodiments, the valve assembly includes a valve body including an inlet portion, an outlet portion, and a center portion that connects the inlet portion to the outlet portion. An isolating element is located in the center portion and is configured to control a flow of a fluid along a main flow pathway from the inlet portion to the outlet portion. The isolating element may be a ball that is rotatable between an open position and a closed position. A pressure relief feature is disposed integrally within the center portion of the valve body to permit a relief flow bypassing the main flow pathway when a pressure differential from the inlet portion to the outlet portion exceeds a threshold. The center portion defines a relief passage around the isolating element to permit the relief flow to flow from the pressure relief feature around the isolating element to the outlet portion when the pressure differential from the inlet portion to the outlet portion exceeds the threshold.

The valve assembly in other exemplary embodiments includes a valve body defining a main flow pathway comprising an inlet and an outlet, and defining a bypass channel in fluid communication with the inlet. A ball is located in the main flow pathway and that is moveable between an open position and a closed position. The ball defines an open pathway through the ball wherein when the ball is in the open position the open pathway fluidly connects the inlet to the outlet to complete the main flow pathway, and when the ball is in the closed position the ball blocks the main flow pathway directly between the inlet and the outlet. A pressure relief feature is disposed in the bypass channel, and the valve body further defines a pressure relief passage comprising a clearance between an outer surface of the ball and the valve body. When the ball is in the closed position and a pressure differential from the inlet to the outlet exceeds a threshold, the pressure relief feature is configured to permit a relief flow from the bypass channel through the pressure relief passage to the outlet.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
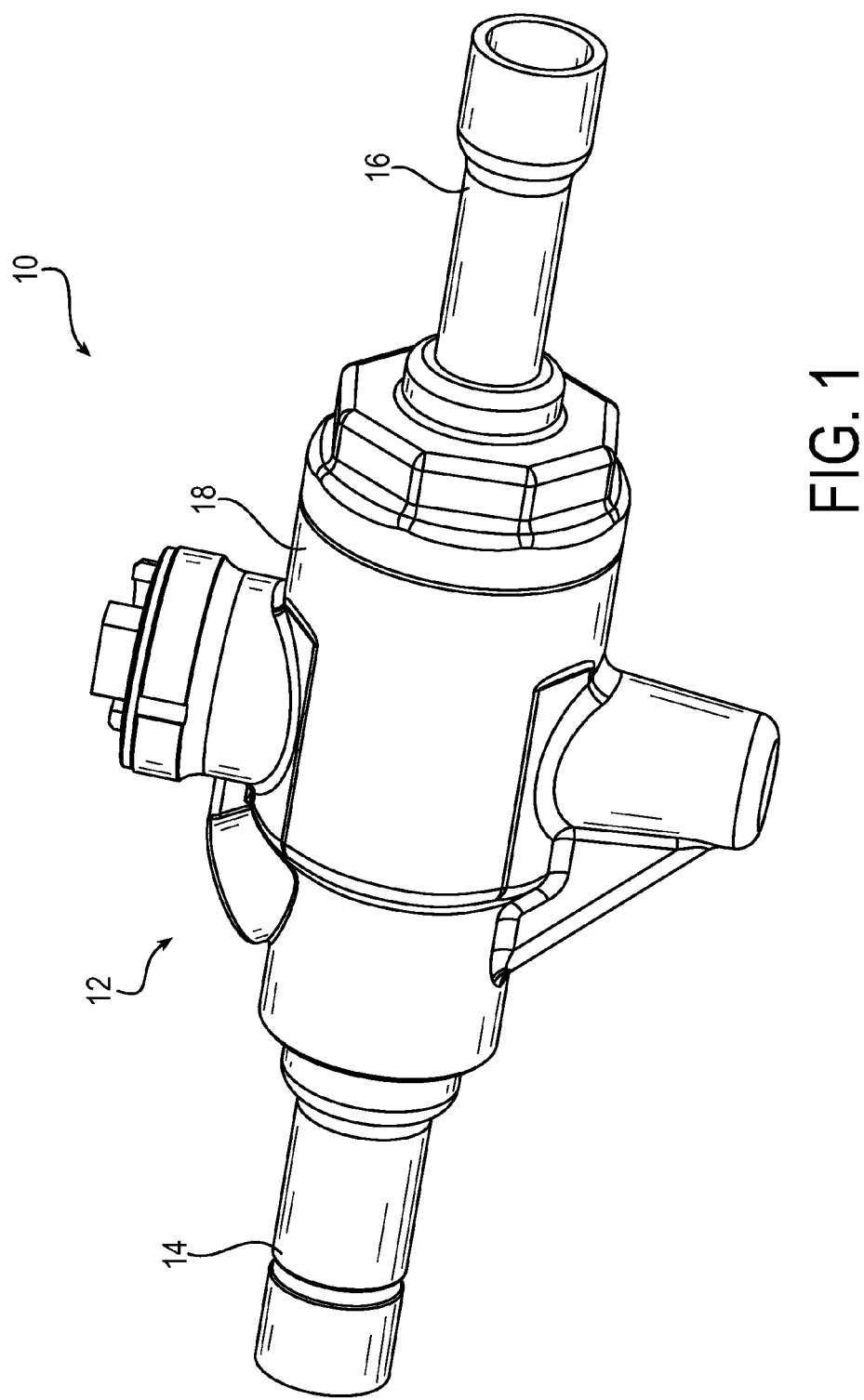
FIG. 1 is a drawing depicting an isometric view of an exemplary isolation valve assembly in accordance with embodiments of the present invention.

Embodiments of the present invention will now be described with reference to the drawings, wherein like reference numerals are used to refer to like elements throughout. It will be understood that the figures are not necessarily to scale.

FIG. 1 is a drawing depicting an isometric view of an exemplary isolation valve assembly 10 in accordance with embodiments of the present invention. The isolation valve assembly 10 includes a valve body 12. The valve body 12 includes an inlet portion 14, an outlet portion 16, and a center portion 18, which define a main fluid pathway through the isolation valve assembly by which fluid may flow through the valve body from the inlet to the outlet. As further detailed below, the center portion 18 defines cavities that house the valve components including a pressure relief feature. The valve body may include a variety of joints, fittings, and similar components as are known in the art, which permit connecting the isolation valve assembly within a broader fluid system.

In general, as further detailed below in exemplary embodiments, an isolating element is located in the center portion and is configured to control a flow of a fluid along the main flow pathway from the inlet portion to the outlet portion. The isolating element may be a ball that is rotatable between an open position and a closed position to control a flow of a fluid along a main flow pathway from the inlet portion to the outlet portion. A pressure relief feature is disposed integrally within the center portion of the valve body to permit a relief flow bypassing the main flow pathway when a pressure differential from the inlet portion to the outlet portion exceeds a threshold. The center portion defines a relief passage around the isolating element to permit the relief flow to flow from the pressure relief feature around the isolating element to the outlet portion when the pressure differential from the inlet portion to the outlet portion exceeds the threshold.

Figure 2:
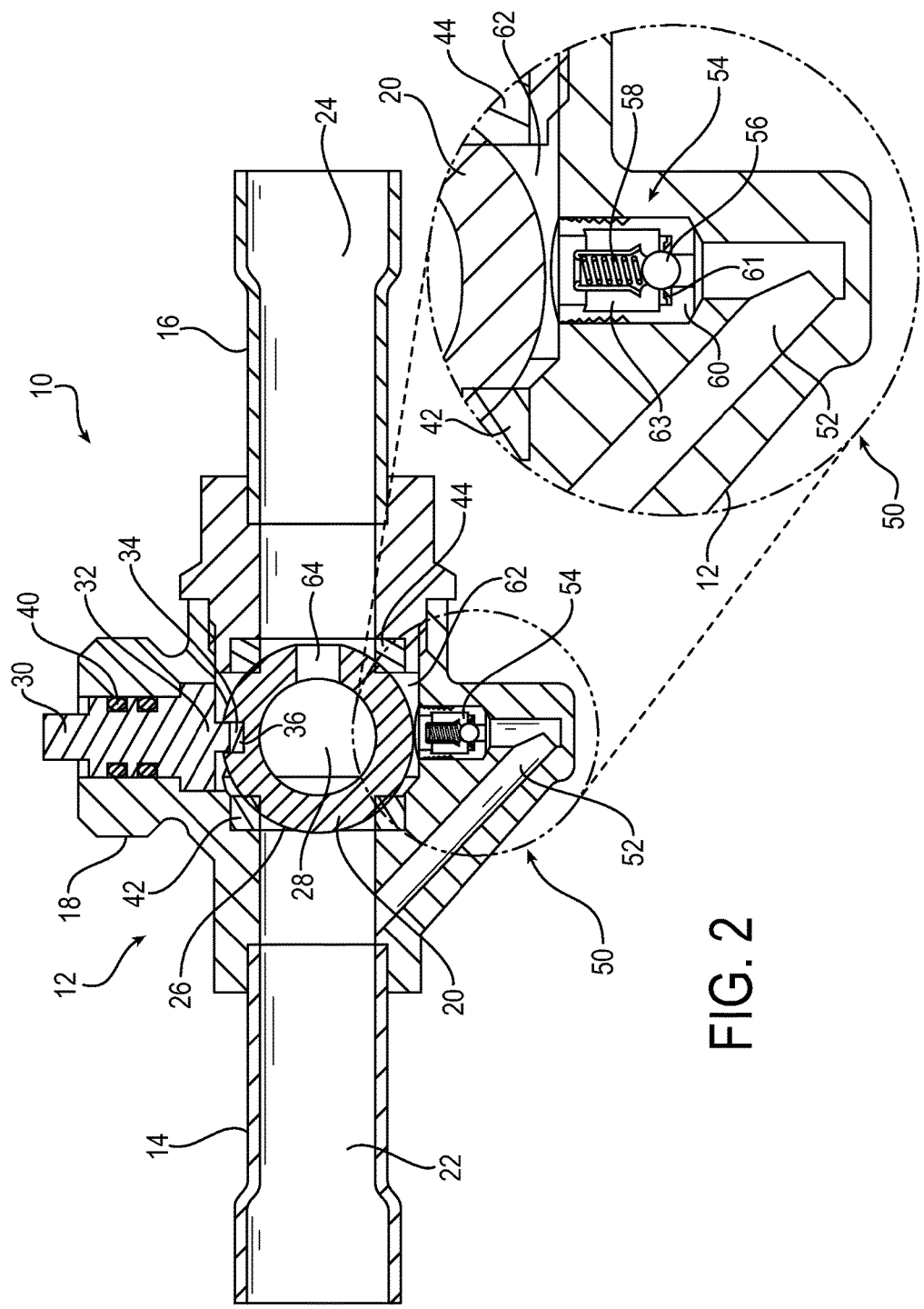
FIG. 2 is a drawing depicting a side cross-sectional view of an exemplary isolation valve configured as a ball valve assembly in accordance with embodiments of the present invention, with the ball valve assembly being in the closed position.
Figure 3:
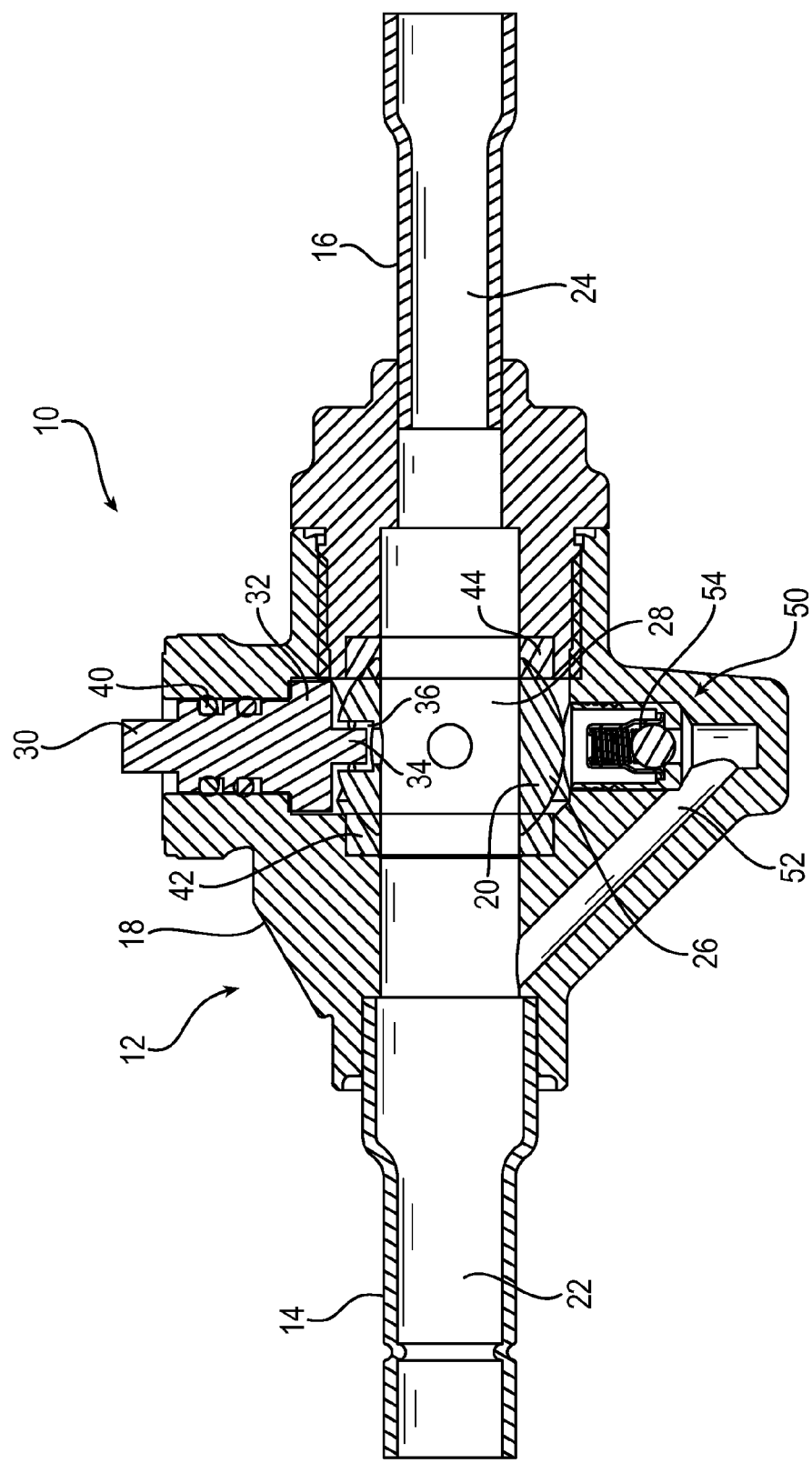
FIG. 3 is a drawing depicting a side cross-sectional view of the exemplary ball valve assembly of FIG. 2, with the ball valve assembly being in the open position.
Figure 4:
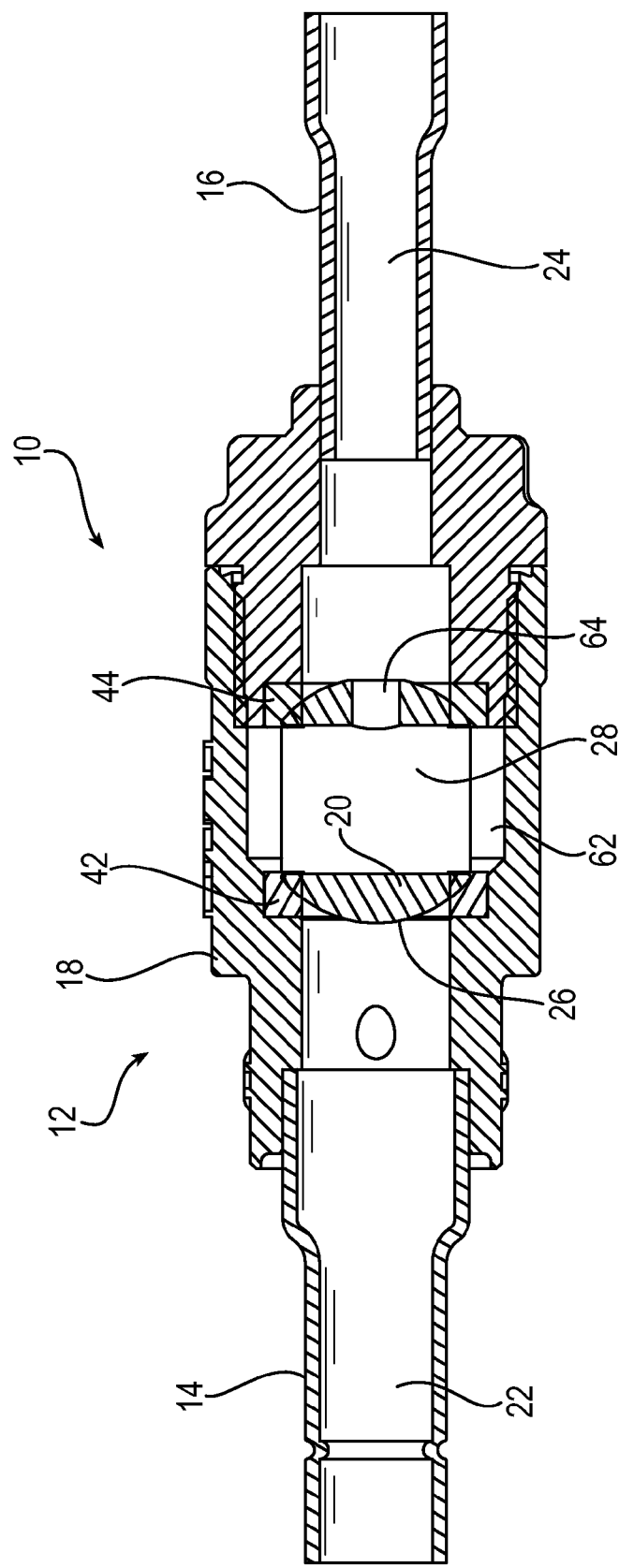
FIG. 4 is a drawing depicting a top cross-sectional view of the exemplary ball valve assembly of FIG. 2, with the ball valve assembly being in the closed position.

FIGS. 2-4 depict various cross-sectional views of an isolation valve assembly 10 comparable to the isolation valve assembly of FIG. 1. In particular, FIG. 2 is a drawing depicting a side cross-sectional view the exemplary isolation valve assembly 10 in accordance with embodiments of the present invention, with the valve assembly being in the closed position. FIG. 3 is a drawing depicting a side cross-sectional view of the exemplary isolation valve assembly 10 of FIG. 2, with the valve assembly being in the open position. FIG. 4 is a drawing depicting a top cross-sectional view of the isolation valve assembly 10 of FIG. 2, with the valve assembly being in the closed position.

As seen in FIGS. 2-4, the isolation valve assembly 10 may be configured as a ball valve assembly 10 including a rotating ball 20 as the isolating element. The isolating element/ball 20 is moveable between a first or closed position (FIG. 2) and a second or open position (FIG. 3). Generally, as further detailed below the valve body defines the main flow pathway comprising an inlet 22 and an outlet 24. The ball 20 is located in the main flow pathway and is moveable between an open position and a closed position. The ball defines an open pathway through the ball, wherein when the ball is in the open position the open pathway fluidly connects the inlet 22 to the outlet 24 to complete the main flow pathway, and when the ball is in the closed position the ball blocks the main flow pathway between the inlet and the outlet.

Referring to the specific exemplary embodiment depicted in the figures, the cross-sectional views show the main flow pathway from an inlet pathway 22 through the inlet portion 14 of the valve body, to an outlet pathway 24 through the outlet portion 16 of the valve body. The valve components including the ball 20 are housed within the center portion 18 of the valve body 12. The ball 20 includes a wall 26 that defines an open pathway 28 through the ball. In the first or closed position of ball 20 shown in FIG. 2, the wall 26 is positioned to block the main flow pathway between the inlet and outlet pathways 22, 24, and the open pathway 28 of the ball 20 is not in fluid communication with the inlet pathway 22. In the second or open position of FIG. 3, the ball 20 has rotated to the second or open position. In such open position, the open pathway 28 though the ball is now in fluid communication with both the inlet and outlet fluid pathways 22, 24 so as to complete the main flow pathway through the ball valve assembly 10. Accordingly, the open pathway 28 fluidly connects the inlet portion directly to the outlet portion of the valve body to complete the main flow pathway when the ball is in the open position. In addition, the wall 26 blocks flow directly from the inlet portion to the outlet portion when the valve assembly is in the closed position. As further detailed below, a relief flow bypasses the main flow pathway through a pressure relief feature when the pressure differential for the inlet to the outlet exceeds a threshold. The threshold is a predetermined property of the system based on the specific system and properties of the system configuration, and is readily ascertainable to one of ordinary skill in the art. Accordingly, one skilled in the art would understand how to configured the pressure relief feature to provide a relief flow in response to any pressure differential threshold that may be applicable.

Control of flow through the main flow pathway is achieved by operation of a valve stem 30 that is operable to drive the ball 20 between the open position and the closed position. The valve stem 30 may include a control element 32 that cooperates with a portion of the ball 20 to move ball 20 between the open and closed positions. In one example configuration shown in the figures, the control element 32 may constitute a key 34 that fits within a key slot 36 in the ball. With such configuration, operation of the valve stem 30 results in the control element 32 interacting against the ball 20 drive the ball into either of the first/closed or second/open positions.

The valve stem 30 also may be sealed against the valve body 12 by one or more shaft seals 40. The shafts seals may be o-ring seals or other suitable annular sealing elements that extend around the valve stem 30. In addition, the ball 20 may be sealed against the valve body by annular ball seals 42 and 44. The ball seal 42 may be provided on the inlet side, and the ball seal 44 may be provided on the outlet side, so as to seal the ball relative to the main flow pathway.

In ordinary operation, in the first or closed position of FIG. 2, as referenced above the ball wall 26 is positioned to block the main flow pathway directly between the inlet and outlet pathways 22, 24, and the open pathway 28 of the ball 20 is not in fluid communication with the inlet pathway 22. To open the valve, the valve stem 30 is operated to drive rotation of the ball to the second or open position of FIG. 3. In the open position of FIG. 3, the open pathway 28 though the ball is now in fluid communication with both the inlet and outlet fluid pathways 22, 24 so as to complete the main flow pathway through the ball valve assembly 10. It will be appreciated that in the closed position of FIG. 3 with no flow through the valve assembly, pressure may build up within the isolated section of piping and the valve assembly. In this regard, when a section of pipe is isolated thereby trapping refrigerant between two valves, the refrigerant temperature will start to rise to the ambient temperature. As the temperature rises the pressure will increase. The propensity for a dangerous pressure build-up is particularly an issue for ball valves for refrigeration systems in which a carbon dioxide based refrigerant is utilized because a small temperature increase results in a drastic spike in pressure.

To relieve such potentially dangerous build-up of pressure, the present invention includes an enhanced pressure relief feature 50. Generally, the pressure relief feature is disposed in a bypass channel that is in fluid communication with the inlet, and the valve body further defines a pressure relief passage comprising a clearance between an outer surface of the ball and the valve body. When the ball is in the closed position and a pressure differential between the inlet and the outlet exceeds the threshold, the pressure relief feature is configured to permit a relief flow from the bypass channel through the pressure relief passage to the outlet. FIG. 2 in particular shows the pressure relief feature 50 both as incorporated into the isolation valve assembly 10, and a more close-up view so as to illustrate details of the pressure relief feature 50. The pressure relief feature 50 may be disposed in a bypass channel 52 that is defined by the valve body and extends from the inlet fluid pathway 22 and through the center portion 18 of the valve body 12.

The pressure relief feature more specifically may be configured as a pressure relief valve 54. The bypass channel 52 leads to the pressure relief valve 54. In exemplary embodiments, the pressure relief valve 54 may be configured as a ball check valve, although any suitable valve known in the art for relieving pressure may be employed. The close-up view portion of FIG. 2 depicts details of the pressure relief valve 54 in the example configuration in which such pressure relief valve 54 is configured as a ball check valve. The pressure relief valve 54 may include a check ball 56 that is biased by an elastic element 58 against a valve seat portion 60 of the valve body to a closed position. The elastic element 58 may be configured as a biasing spring. The pressure relief valve 54 further may include a check valve cage 61 that retains the spring and ball in the check valve assembly. That cage has cross holes to allow flow to escape an go through the assembly when the ball is moved from the seat, and the cage also serves as a stop for the ball in the open direction.

In general, when the isolation ball 20 is in the closed position and the pressure differential exceeds the threshold, the check ball is configured to move off the valve seat to permit the relief flow through the pressure relief feature. Referring to the figures, when the pressure differential subjected to the bypass channel 52 of the isolation valve assembly 10 builds up above the threshold pressure differential, the pressure relief valve 54 opens to permit a pressure relief flow from the inlet pathway 22 through the bypass channel 52 and the pressure relief valve 54, and ultimately out through the outlet pathway 24. For example, the excessive pressure differential may move the check ball 56 off of the valve seat 60 against the bias of the elastic element 58 to an open position. With the check ball moved off the valve seat to the open position, a relief flow is now permitted from the bypass channel 52 and through the pressure relief valve 54. The pressure differential across the isolation valve assembly 10 will then decrease due to the pressure relief flow. Once the pressure differential falls below the threshold, the bias of the elastic element 58 will dominate and force the check ball 56 back into the closed position against the valve seat 60.

Details of the relief flow pathway are particularly illustrated with reference to FIG. 2 and additionally FIG. 4. FIG. 4 is a drawing depicting a top cross-sectional view of the exemplary ball valve assembly of FIG. 2, with the valve assembly being in the closed position. As seen in such figures, in a region adjacent the pressure relief valve 54, there is defined a pressure relief passage 62 constituting a clearance between the isolation ball 20 and the valve body 12 in the area of the ball seals 42 and 44. When the pressure relief valve 54 is open, the relief flow flows through the pressure relief valve 54 via valve flow passages 63 to the pressure relief passage 62. The pressure relief passage 62 permits the relief flow to proceed around an outer surface of the ball 20 and past the ball seals 42 and 44. As seen best in the top view of FIG. 4, the flow around the ball 20 can proceed into and through the open pathway 28 defined by the ball 20. The open pathway 28 fluidly connects the pressure relief passage 62 to the outlet pathway 24. In particular, the relief flow may exit the ball 20 through a relief outlet 64 that fluidly connects the open pathway 28 with the outlet pathway 24 when the ball 20 is in the first or closed position. In this manner, a relief flow proceeds through the isolation valve assembly 10 so as to relieve any excess pressure build-up on the inlet side of the valve.

The configuration of the pressure relief feature 50 of the present invention has significant advantages over conventional configurations. The isolation ball valve assembly 10 is configured with such pressure relief feature 50 integral within the valve body 12. The integral configuration reduces the number of braze joints as compared to existing two-valve solutions with multiple parallel flow pathways, thereby reducing cost in brazing materials, labor to create the joints, and materials. By reducing the number of braze joints, potential leak paths through the system also are reduced which enhances valve reliability.

Figure 5:
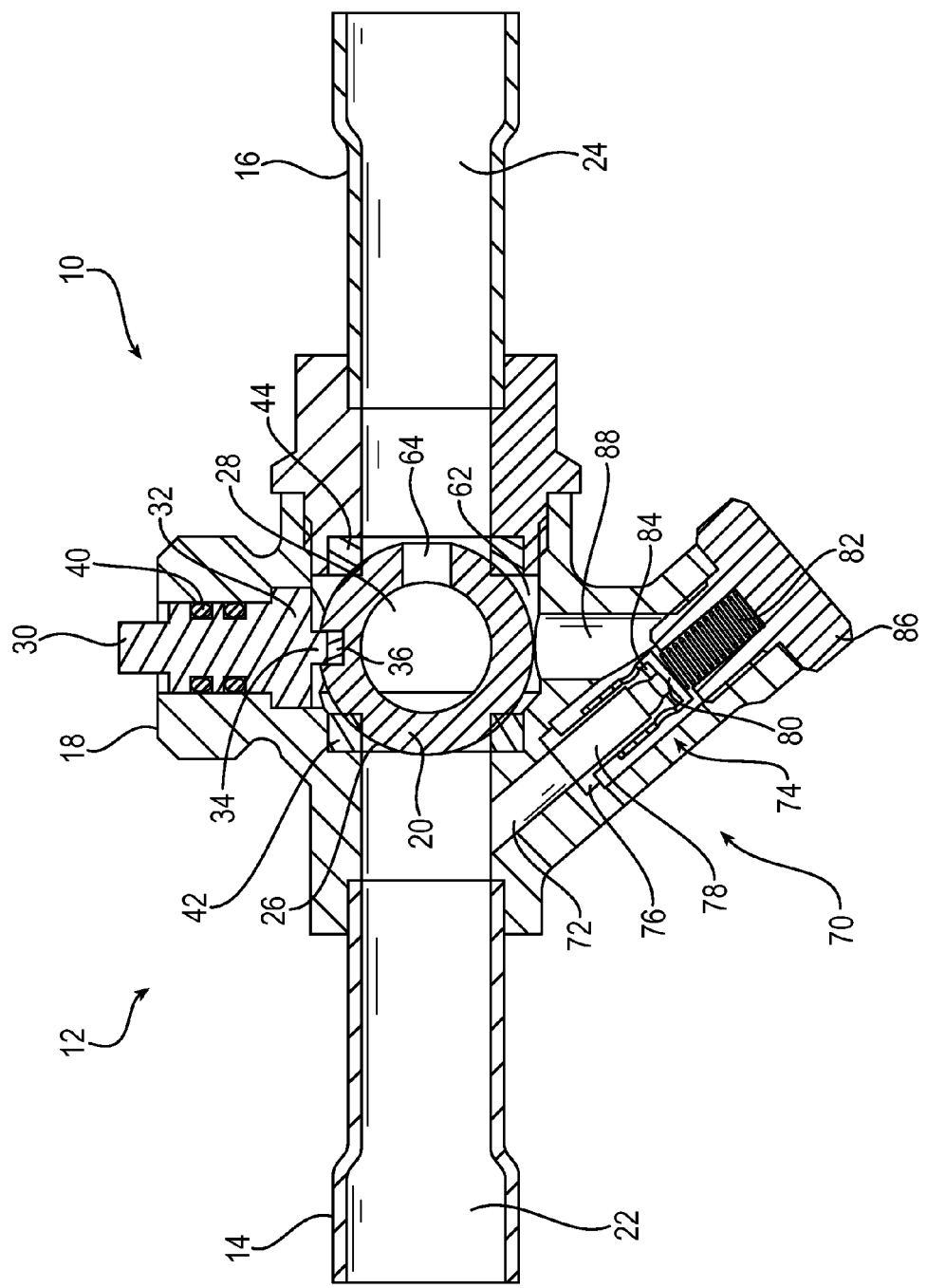
FIG. 5 is a drawing depicting a side cross-sectional view of an alternative embodiment of an exemplary ball valve assembly in accordance with embodiments of the present invention, with the ball valve assembly being in the closed position.
Figure 6:
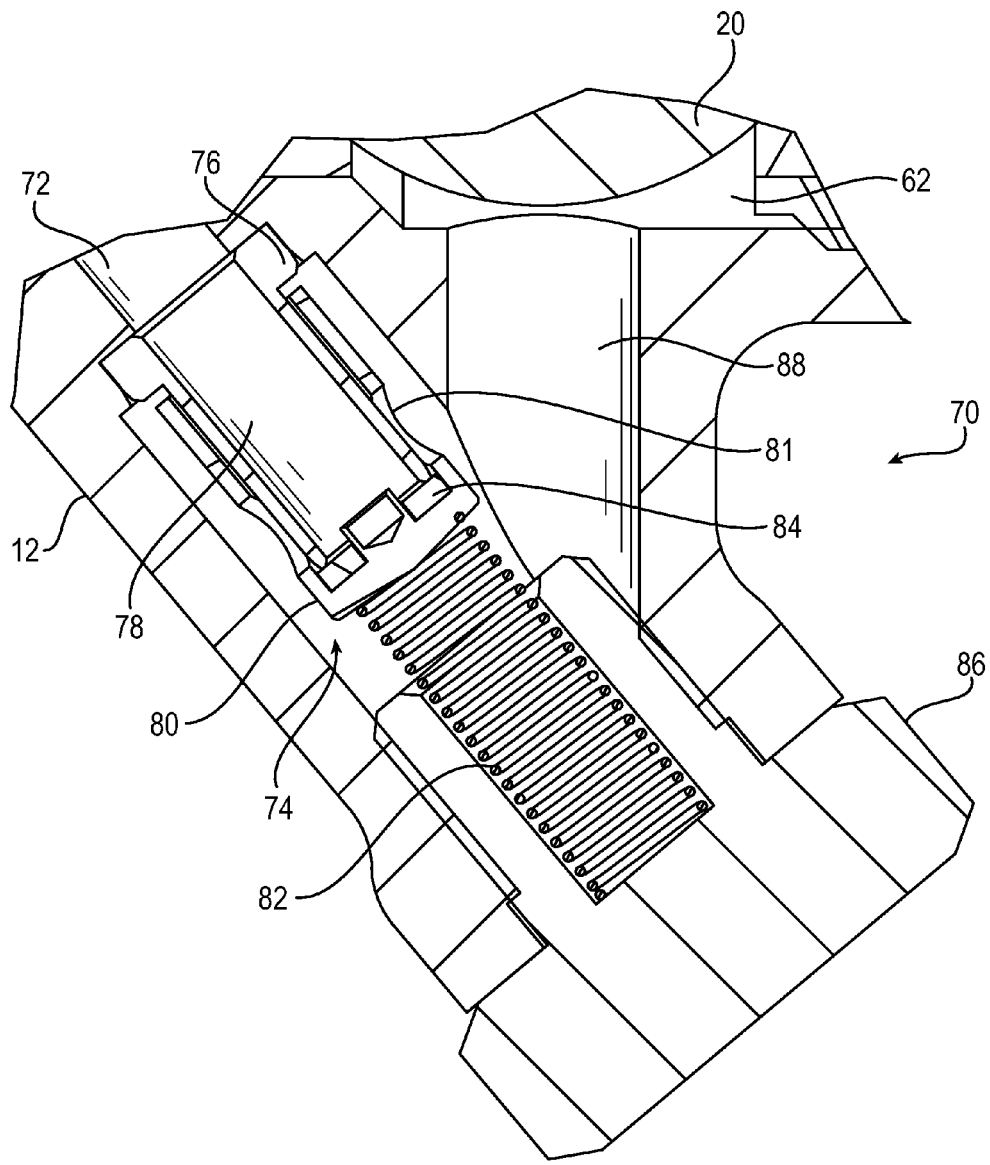
FIG. 6 is a drawing depicting a close-up view of the ball valve assembly of FIG. 5 in the area of a pressure relief valve in accordance with embodiments of the present invention.

FIG. 5 is a drawing depicting a side cross-sectional view of an alternative embodiment of an exemplary ball valve assembly 10 in accordance with embodiments of the present invention, with the valve assembly being in the closed position. Accordingly, like components in FIG. 5 are identified with the same reference numerals as in FIGS. 1-4. The embodiment of FIG. 5 is characterized by an alternative configuration of a pressure relief feature, denoted in FIG. 5 as pressure relief feature 70. FIG. 6 is a drawing depicting a close-up view of the ball valve assembly of FIG. 5 in the area of the pressure relief feature 70.

The pressure relief feature 70, similarly as in the previous embodiment, may be disposed in a first bypass channel 72 that extends from the inlet fluid pathway 22 and through the center portion 18 of the valve body 12. The bypass channel 72 leads to a pressure relief valve 74. In the embodiment of FIG. 5, the pressure relief valve 74 may include rigid valve seat 76 that is fixed within the valve body 12. In exemplary embodiments, the rigid valve seat may be made of steel. The valve seat may define a flow passage 78 that is in fluid communication with the first bypass channel 72. The pressure relief valve 74 further includes a moveable poppet 80 that is biased by an elastic element 82 against the valve seat 76 to a closed position. The elastic element 82 may be configured as a biasing spring. The efficacy of the closed position may be enhanced by a gasket element 84, which may be made of Teflon® or comparable suitable material, that is formed into the poppet 80. The poppet 80 may include passages 81 that permit a flow through the poppet when the poppet is in the open position. The valve assembly further may include a cap 86 that is connectable to the valve body 12 and houses at least a portion of the pressure relief valve 74. For example, the elastic element 82 may be housed within the cap 86 that is connectable to the valve body 12. The cap 86 may be threadably connected to the valve body, connectable with a snap fit, or by any other suitable means.

In general, when the isolation ball 20 is in the closed position and the pressure differential from the inlet to the outlet exceeds the threshold, the poppet is configured to move off the valve seat to permit the relief flow through the pressure relief feature. Referring to FIGS. 5 and 6, when the pressure differential from the inlet side into the bypass channel of the isolation valve assembly 10 builds up above the threshold, the pressure relief valve 74 opens to permit a pressure relief flow from the inlet pathway 22 through the bypass channel 72 and the pressure relief valve 74, and ultimately out through the outlet pathway 24. For example, the excessive pressure differential may move the poppet 80 off of the valve seat 76 against the bias of the elastic element 82 to an open position. With the poppet moved off the valve seat to the open position, a relief flow is now permitted from the bypass channel 72 and through flow passage flow passage 78 in the valve seat and further through the passages 81 in the poppet 80. The relief flow can then flow through a second bypass channel 88 defined by the valve body 12 and toward the isolation ball 20. As in the previous embodiment, the pressure differential across the isolation valve assembly 10 will then decrease due to the pressure relief flow. Once the pressure differential falls below the threshold, the bias of the elastic element 82 will dominate and force the poppet 80 back into the closed position against the valve seat 76.

In the embodiment of FIGS. 5 and 6, the second bypass channel 88 fluidly connects the pressure relief valve 74 to the pressure relief passage 62. Once the relief flow proceeds through the second bypass channel 88, the configuration of the isolation valve assembly and resultant relief flow is comparable to the previous embodiment. Similarly as described above, in the embodiment of FIG. 5 there is the relief passage 62 constituting a clearance between the isolation ball 20 and the valve body 12. When the pressure relief valve 74 is open, the relief passage 62 permits the relief flow to proceed around an outer surface of the ball 20 past the ball seals 42 and 44. The flow around the ball 20 can proceed into and through the open pathway 28 defined by the ball 20. The relief flow then may exit the ball 20 through the relief outlet 64 that is in fluid communication with the outlet pathway 24 when the ball 20 is in the first or closed position. In this manner, a relief flow proceeds through the isolation valve assembly 10 so as to relieve any excess pressure build-up.

An aspect of the invention, therefore, is a valve assembly. In exemplary embodiments, the valve assembly includes a valve body defining a main flow pathway comprising an inlet and an outlet, and defining a bypass channel in fluid communication with the inlet; a ball located in the main flow pathway and that is moveable between an open position and a closed position; the ball defining an open pathway through the ball wherein when the ball is in the open position the open pathway fluidly connects the inlet to the outlet to complete the main flow pathway, and when the ball is in the closed position the ball blocks the main flow pathway between the inlet and the outlet; a pressure relief feature disposed in the bypass channel; and the valve body further defining a pressure relief passage comprising a clearance between an outer surface of the ball and the valve body. When the ball is in the closed position and a pressure differential from the inlet to the outlet exceeds a threshold, the pressure relief feature is configured to permit a relief flow from the bypass channel through the pressure relief passage to the outlet. The valve assembly may include one or more of the following features, either individually or in combination.

In an exemplary embodiment of the valve assembly, when the ball is in the closed position, the open pathway fluidly connects the pressure relief passage to the outlet.

In an exemplary embodiment of the valve assembly, the ball further defines a relief outlet, and when the ball is in the closed position, the relief outlet fluidly connects the open pathway to the outlet.

In an exemplary embodiment of the valve assembly, the pressure relief feature comprises a ball check valve including a check ball that is biased by an elastic element against a valve seat portion of the valve body.

In an exemplary embodiment of the valve assembly, the elastic element is a biasing spring.

In an exemplary embodiment of the valve assembly, the pressure relief feature further comprises a cage that retains the spring and check ball.

In an exemplary embodiment of the valve assembly, when the ball is in the closed position and the pressure differential exceeds the threshold, the check ball is configured to move off the valve seat to permit the relief flow through the pressure relief feature.

In an exemplary embodiment of the valve assembly, the pressure relief feature comprises a poppet that is biased by an elastic element against a rigid valve seat fixed within the valve body.

In an exemplary embodiment of the valve assembly, the elastic element is a biasing spring.

In an exemplary embodiment of the valve assembly, when the ball is in the closed position and the pressure differential exceeds the threshold, the poppet is configured to move off the valve seat to permit the relief flow through the pressure relief feature.

In an exemplary embodiment of the valve assembly, the valve body defines a second bypass channel that fluidly connects the pressure relief feature to the pressure relief passage.

In an exemplary embodiment of the valve assembly, the valve assembly further includes a cap that is connectable to the valve body and configured to house at least a portion of the pressure relief feature.

In another embodiment of the valve assembly, the valve assembly may include a valve body including an inlet portion, an outlet portion, and a center portion that connects the inlet portion to the outlet portion; an isolating element located in the center portion and configured to control a flow of a fluid along a main flow pathway from the inlet portion to the outlet portion; a pressure relief feature disposed integrally within the center portion of the valve body to permit a relief flow bypassing the main flow pathway when a pressure differential from the inlet portion to the outlet portion exceeds a threshold; and the center portion defining a relief passage around the isolating element to permit the relief flow to flow from the pressure relief feature around the isolating element to the outlet portion when the pressure differential exceeds the threshold. The other embodiment of the valve assembly may include one or more of the following features, either individually or in combination.

In an exemplary embodiment of the valve assembly, the isolating element comprises a ball that is moveable between an open position and a closed position to control a flow of a fluid along a main flow pathway from the inlet portion to the outlet portion.

In an exemplary embodiment of the valve assembly, the ball defines an open pathway and a relief outlet for communicating the relief flow from the relief passage to the outlet portion when the ball is in the closed position.

In an exemplary embodiment of the valve assembly, the open pathway fluidly connects the inlet portion directly to the outlet portion to complete the main flow pathway when the ball is in the open position.

In an exemplary embodiment of the valve assembly, the ball has a wall that blocks flow directly from the inlet portion to the outlet portion when the valve assembly is in the closed position, and the relief flow bypasses the main flow pathway through the pressure relief feature when the pressure differential exceeds the threshold.

In an exemplary embodiment of the valve assembly, the valve assembly further includes a valve stem that is operable to drive the ball between the open position and the closed position.

In an exemplary embodiment of the valve assembly, the pressure relief feature comprises a ball check valve including a check ball that is biased by an elastic element against a valve seat portion of the valve body.

In an exemplary embodiment of the valve assembly, the pressure relief feature comprises a poppet that is biased by an elastic element against a rigid valve seat fixed within the valve body, and the valve assembly further includes a cap that is connectable to the valve body and configured to house at least a portion of the pressure relief feature.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A valve assembly comprising:
a valve body defining a main flow pathway comprising an inlet and an outlet, and defining a bypass channel in fluid communication with the inlet;
a ball located in the main flow pathway and that is moveable between an open position and a closed position;
the ball defining an open pathway through the ball wherein when the ball is in the open position the open pathway fluidly connects the inlet to the outlet to complete the main flow pathway, and when the ball is in the closed position the ball blocks the main flow pathway between the inlet and the outlet;
a pressure relief feature disposed in the bypass channel; and
the valve body further defining a pressure relief passage comprising a clearance between an outer surface of the ball and the valve body;
wherein when the ball is in the closed position and a pressure differential from the inlet to the outlet exceeds a threshold, the pressure relief feature is configured to permit a relief flow from the bypass channel through the pressure relief passage to the outlet.

2. The valve assembly of claim 1, wherein when the ball is in the closed position, the open pathway fluidly connects the pressure relief passage to the outlet.

3. The valve assembly of claim 2, wherein the ball further defines a relief outlet, and when the ball is in the closed position, the relief outlet fluidly connects the open pathway to the outlet.

4. The valve assembly of claim 1, wherein the pressure relief feature comprises a ball check valve including a check ball that is biased by an elastic element against a valve seat portion of the valve body.

5. The valve assembly of claim 4, wherein the elastic element is a biasing spring.

6. The valve assembly of claim 5, wherein the pressure relief feature further comprises a cage that retains the spring and check ball.

7. The valve assembly of claim 4, wherein when the ball is in the closed position and the pressure differential exceeds the threshold, the check ball is configured to move off the valve seat to permit the relief flow through the pressure relief feature.

8. The valve assembly of claim 1, wherein the pressure relief feature comprises a poppet that is biased by an elastic element against a rigid valve seat fixed within the valve body.

9. The valve assembly of claim 8, wherein the elastic element is a biasing spring.

10. The valve assembly of claim 8, wherein when the ball is in the closed position and the pressure differential exceeds the threshold, the poppet is configured to move off the valve seat to permit the relief flow through the pressure relief feature.

11. The valve assembly of claim 10, wherein the valve body defines a second bypass channel that fluidly connects the pressure relief feature to the pressure relief passage.

12. The valve assembly of claim 8, further comprising a cap that is connectable to the valve body and configured to house at least a portion of the pressure relief feature.

13. A valve assembly comprising:
  a valve body including an inlet portion, an outlet portion, and a center portion that connects the inlet portion to the outlet portion;
  an isolating element located in the center portion and configured to control a flow of a fluid along a main flow pathway from the inlet portion to the outlet portion; a pressure relief feature disposed integrally within the center portion of the valve body to permit a relief flow bypassing the main flow pathway when a pressure differential from the inlet portion to the outlet portion exceeds a threshold; and
  the center portion defining a relief passage around the isolating element to permit the relief flow to flow from the pressure relief feature around the isolating element to the outlet portion when the pressure differential exceeds the threshold;
  wherein the isolating element comprises a ball that is moveable between an open position and a closed position to control a flow of a fluid along a main flow pathway from the inlet portion to the outlet portion; and
  wherein the ball defines an open pathway and a relief outlet for communicating the relief flow from the relief passage to the outlet portion when the ball is in the closed position.

14. The valve assembly of claim 13, wherein the open pathway fluidly connects the inlet portion directly to the outlet portion to complete the main flow pathway when the ball is in the open position.

15. The valve assembly of claim 14, wherein the ball has a wall that blocks flow directly from the inlet portion to the outlet portion when the valve assembly is in the closed position, and the relief flow bypasses the main flow pathway through the pressure relief feature when the pressure differential exceeds the threshold.

16. The valve assembly of claim 13, further comprising a valve stem that is operable to drive the ball between the open position and the closed position.

17. The valve assembly of claim 13, wherein the pressure relief feature comprises a ball check valve including a check ball that is biased by an elastic element against a valve seat portion of the valve body.

18. The valve assembly of claim 13, wherein the pressure relief feature comprises a poppet that is biased by an elastic element against a rigid valve seat fixed within the valve body; and the valve assembly further comprises a cap that is connectable to the valve body and configured to house at least a portion of the pressure relief feature.

* * * * *